US011235639B2

(12) United States Patent
Martell et al.

(10) Patent No.: US 11,235,639 B2
(45) Date of Patent: Feb. 1, 2022

(54) SYSTEMS AND METHODS FOR AUTOMATIC AIR CONDITIONING RESTART

(71) Applicant: Phillips & Temro Industries, Inc., Eden Prairie, MN (US)

(72) Inventors: Jeffrey James Martell, Bloomington, MN (US); Eric Graham Ruggles, Bloomington, MN (US); John David Sweazey, Eden Prairie, MN (US)

(73) Assignee: Phillips & Temro Industries, Inc., Eden Prairie, MN (US)

( * ) Notice: Subject to any disclaimer, the term of this patent is extended or adjusted under 35 U.S.C. 154(b) by 176 days.

(21) Appl. No.: 16/257,949

(22) Filed: Jan. 25, 2019

(65) Prior Publication Data
US 2019/0232753 A1     Aug. 1, 2019

Related U.S. Application Data

(60) Provisional application No. 62/623,169, filed on Jan. 29, 2018.

(51) Int. Cl.
*B60H 1/00*     (2006.01)
*B60H 1/08*     (2006.01)
(Continued)

(52) U.S. Cl.
CPC ..... *B60H 1/00778* (2013.01); *B60H 1/00428* (2013.01); *B60H 1/00814* (2013.01); *B60H 1/00964* (2013.01); *B60H 1/08* (2013.01); *B60H 1/322* (2013.01); *B60H 1/323* (2013.01); *B60H 1/3208* (2013.01); *B60W 10/30* (2013.01); *F02N 11/084* (2013.01); *B60H 2001/3292* (2013.01); *F02N 2200/023* (2013.01); *F02N 2200/122* (2013.01); *F02N 2300/2011* (2013.01)

(58) Field of Classification Search
None
See application file for complete search history.

(56) References Cited

U.S. PATENT DOCUMENTS 5,488,283 A * 1/1996 Dougherty .............. B60L 58/19
307/10.1
9,216,628 B2 * 12/2015 Self ......................... F25B 19/00
(Continued)

FOREIGN PATENT DOCUMENTS

CN     202345619 U   *   7/2012

OTHER PUBLICATIONS

CN202345619U English Translation (Year: 2012).*

*Primary Examiner* — Len Tran
*Assistant Examiner* — Jenna M Hopkins
(74) *Attorney, Agent, or Firm* — Foley & Lardner LLP (57) ABSTRACT

A vehicle includes an engine, a start-stop system configured to stop and restart operation of the engine in response to predetermined triggers, and an auxiliary air conditioning AC system including a controller communicably coupled to the start-stop system. The start-stop system is configured to provide a first indication to the auxiliary AC system indicating ignition of the engine and a second indication to the auxiliary AC system after stopping the engine. The auxiliary AC system is configured to turn off the auxiliary AC system in response to receiving the first indication and restart the auxiliary AC system in response to receiving the second indication.

16 Claims, 7 Drawing Sheets

(51) Int. Cl.
*F02N 11/08* (2006.01)
*B60W 10/30* (2006.01)
*B60H 1/32* (2006.01)

(56) References Cited

U.S. PATENT DOCUMENTS

| | | | |
|---|---|---|---|
| 9,233,596 B2* | 1/2016 | Chu | B60H 1/323 |
| 10,160,325 B2* | 12/2018 | Lee | F02N 11/087 |
| 2014/0306523 A1* | 10/2014 | Namuduri | F02N 11/087 |
| | | | 307/10.6 |
| 2015/0258911 A1* | 9/2015 | Sugiyama | B60L 50/16 |
| | | | 701/22 |
| 2017/0305234 A1* | 10/2017 | Krofchalk | B60R 16/03 |

* cited by examiner

SYSTEMS AND METHODS FOR AUTOMATIC AIR CONDITIONING RESTART

CROSS-REFERENCE TO RELATED PATENT APPLICATIONS

This application claims the benefit of and priority to U.S. Provisional Application No. 62/623,169, filed Jan. 29, 2018, the entire disclosure of which is hereby incorporated by reference herein.

BACKGROUND

The following description is provided to assist the understanding of the reader. None of the information provided or references cited are admitted to be prior art.

Vehicles may include start-stop systems that automatically shut down the vehicle's engine if the engine is idling for a predetermined period. This reduces the overall amount of time that the vehicle is idling and reduces fuel consumption and emissions. Such start-stop systems can create inconveniences. For example, if the vehicle's engine is shut off via a start-stop system, the vehicle's air conditioning system may shut down, forcing a driver to reactivate the air conditioner. This is particularly burdensome for people sleeping in the vehicle. For example, over-the-road vehicles often include sleeping compartments for which it is desirable to maintain a consistent temperature even when a vehicle's engine is shut off.

SUMMARY

One embodiment relates to a vehicle. The vehicle includes an engine, a start-stop system configured to stop and restart operation of the engine in response to predetermined triggers, and an auxiliary air conditioning AC system including a controller communicably coupled to the start-stop system. The start-stop system is configured to provide a first indication to the auxiliary AC system indicating ignition of the engine and a second indication to the auxiliary AC system after stopping the engine. The auxiliary AC system is configured to turn off the auxiliary AC system in response to receiving the first indication and restart the auxiliary AC system in response to receiving the second indication.

Another embodiment relates to a control circuit for an auxiliary AC system of a vehicle. The control circuit includes a first input line coupled to an ignition switch of the vehicle. The control circuit also includes a second input line coupled to a start-stop system of the vehicle, wherein the start stop system is configured to assert a control signal to the control circuit via the second input line in response to turning an engine of the vehicle on and remove the control signal in response to turning the engine of the vehicle off. The control circuit also includes a NOR gate coupled to the first and second input lines. The control circuit also includes output circuitry coupled to the NOR gate, wherein the output circuitry is configured to assert an activation signal to the auxiliary AC system when an output of the NOR gate is positive such, when the control signal is removed, the activation signal is asserted to restart the auxiliary AC system after the vehicle is turned off via the start-stop system.

Another embodiment relates to a method of controlling an air conditioning (AC) system and start-stop system of a vehicle. The method includes receiving, by a control circuit of the AC system, a first indication that the start-stop system has turned an engine of the vehicle off. The method also includes restarting, by the control circuit of the AC system, the AC system such that the AC system automatically powers on when the engine of the vehicle is off in response to the first indication.

DETAILED DESCRIPTION

Reference will now be made to various embodiments, one or more examples of which are illustrated in the figures. The embodiments are provided by way of explanation, and not meant to be limited. For example, features illustrated or described as part of one embodiment may be used with another embodiment to yield still a further embodiment. It is intended that the present application encompass these and other modifications and variations as come within the scope and spirit of the present disclosure.

Referring generally to the figures, described herein is a control system for an auxiliary air conditioning ("AC") system of a vehicle. The auxiliary AC system is, for example, separate from a main AC system of the vehicle, and configured to utilize a power source separate from the vehicle's main battery. The control system of the vehicle is configured to activate and deactivate the auxiliary AC system based on operational states of various other components of the vehicle. In various embodiments, the control system activates and deactivates the auxiliary AC system based on actions of a start-stop system of the vehicle. For example, the control system may automatically restart the auxiliary AC system without driver interaction after the engine is shut off by the start-stop system in response to receiving an indication from the start-stop system. In some embodiments, the start-stop system transmits a control signal to the auxiliary AC system when the engine is turned on via the start-stop system. In response to the signal being asserted, the control circuit turns off the auxiliary AC system. When the control signal is removed when the engine is shut off via the start-stop system, however, the auxiliary AC system restarts. As such, the auxiliary AC system is automatically restarted without driver intervention after the engine is turned off via the start-stop system. Thus, via the systems, methods, and apparatuses described herein, there is no need for the driver to manually restart the auxiliary AC system.

Figure 1:
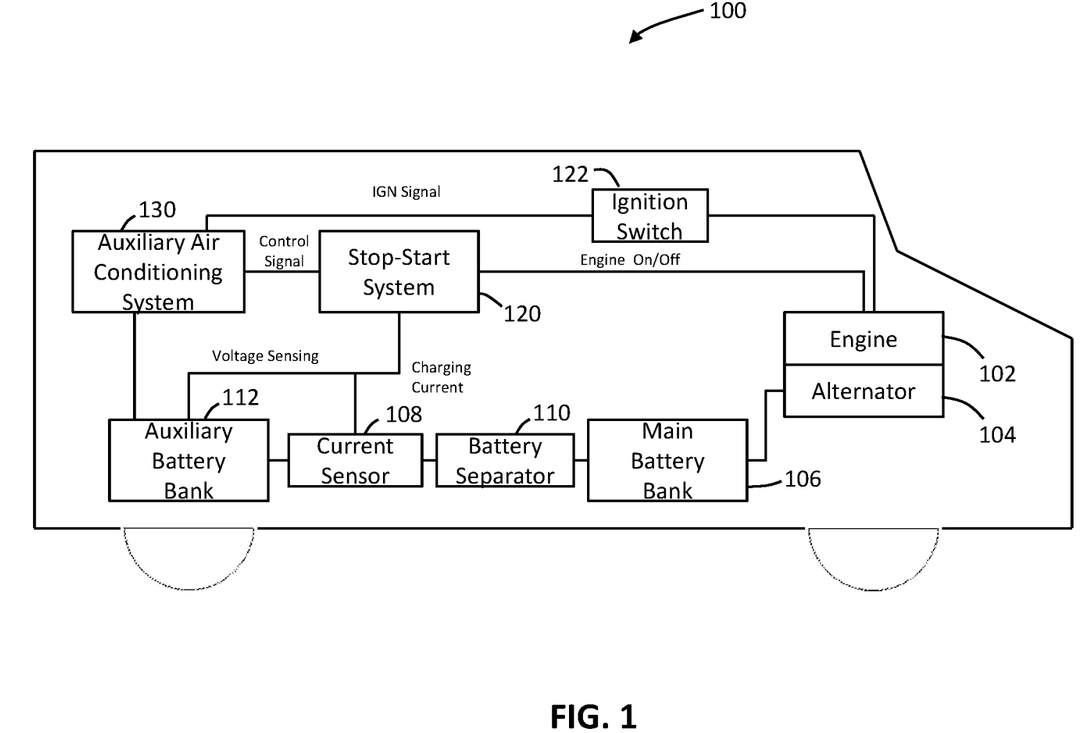
FIG. 1 is a block diagram of a vehicle including an auxiliary air conditioning ("AC") system and a start-stop system, according to an example embodiment.

Referring now to FIG. 1, a block diagram of a vehicle 100 including an auxiliary AC system 130 and a start-stop system 120 is shown, according to an example embodiment. In various embodiments, the vehicle 100 is any automotive vehicle. In some embodiments, the vehicle 100 is an over-the-road vehicle such as a semi-trailer truck including a tractor unit and a trailer. The tractor unit may comprise a prime mover (e.g., the engine 102) and a cab for housing the driver. The cab may include a sleeper compartment, for example, disposed rearward of a driver's seat. It should be understood that the vehicle 100 includes various additional components that have been left out for purposes of illustration.

Examples of a suitable engine 102 include, but are not limited to, an internal combustion gas-powered engine, a diesel engine, a fuel cell driven motor, an electric motor, or any other type of motor capable of providing mechanical energy. These prime movers may be used alone or in combination with one or more additional power sources (as in a hybrid vehicle) to provide mechanical energy. Engine 102 generates mechanical energy (e.g., angular momentum) from an energy source (e.g., fuel). Such mechanical energy may be coupled to a motion transfer device (e.g., a transmission), which provides the energy to various motive members (e.g., wheels via a differential) of the vehicle 100. Rotational energy generated by the engine 102 is also transferred to an alternator 104 (e.g., via a belt coupled to a crankshaft of the engine 102) for conversion to electrical energy used to power various components of the vehicle 100. As shown, electrical energy produced via the alternator 104 is used to charge a main battery bank 106 of the vehicle 100. During operation of the vehicle 100, current from the main battery bank 106 serves as a power source for various subsystems (e.g., a main AC system, dashboard components, lighting systems, etc.) of the vehicle 100.

Vehicle 100 further includes an ignition switch 122 operable to complete various circuits in a control system to power on various subsystems of the vehicle 100. For example, upon closure of the ignition switch 122 (e.g., upon a driver turning a key), electrical current from the main battery bank 106 may activate a starter solenoid configured to initiate cycling of engine 102. Closure of the ignition switch 122 may complete many other circuits in the control system to power on additional subsystems (e.g., radio, lighting, etc.) of the vehicle 100. As shown, the ignition switch 122 is also connected to the auxiliary AC system 130 such that, upon closure of the ignition switch 122, an ignition ("IGN") signal is transmitted to the auxiliary AC system 130. As described herein, the auxiliary AC system 130 may include control circuitry configured to power down the auxiliary AC system 130 in response to receiving the IGN signal.

Vehicle 100 also includes a start-stop system 120. The start-stop system 120 may include a microcontroller configured to automatically stop operation of the engine 102 responsive to certain triggers being detected. For example, in one embodiment, the start-stop system 120 stops the engine 102 when the vehicle's parking brake is engaged. The start-stop system 120 may be communicably coupled to various other vehicle sub-components (e.g., transmission, an acceleration pedal, crankshaft, wheels, etc.) for detection of various triggers for turning the engine 102 off (e.g., via breaking the starter circuit). In various embodiments, the microcontroller of the start-stop system 120 is configured to activate an electrical motor to restart the engine 102 in response to pre-conditions (e.g., the driver pressing an accelerator petal, a driver disengaging a parking break, etc.) being detected. In various embodiments, the vehicle 100 (e.g., on a dashboard thereof) includes a user-input switch (e.g., button) through which the driver may activate or deactivate the start-stop system 120.

As shown, the start-stop system 120 is communicably coupled to the auxiliary AC system 130. The auxiliary AC system 130 generally includes a control circuit, a compressor, a condenser, and an evaporator. The evaporator includes a coil containing refrigerant that evaporates and absorbs heat from within the vehicle 100. A blower distributes cooled air throughout the interior of the vehicle 100. The compressor pressurizes the evaporated refrigerant gas to cause it to condense, and a fan blows air heated as a result of the condensing outside of the vehicle 100. In some embodiments the auxiliary AC system 130 includes a separate evaporator unit, frame rail unit, and power unit. In an embodiment, the frame rail unit is installed on a frame rail of the vehicle 100 and includes the compressor and condenser, a battery separator 110, and an auxiliary battery bank 112 powering the auxiliary AC system 130. The power module may be mounted interior to the cab and include a power converter to convert power from the auxiliary battery bank 112 (e.g., from 12 V to 120 V) for utilization by the auxiliary AC system 130. The evaporator unit is installed inside of the cab of the vehicle 100 to cool air located therein. In some embodiments, the auxiliary AC system 130 includes a user-interface device (e.g., thermostat) permitting the driver or other user to control various setpoints or set heating and cooling parameters controlling operation of the auxiliary AC system 130.

In various embodiments, the start-stop system 120 is configured to transmit a control signal to the auxiliary AC system 130 upon the start-stop system 120 turning on the engine 102. The control signal is maintained at a consistent voltage until the start-stop system 120 powers down the engine 102. As described herein, the control circuit of the auxiliary AC system 130 is configured to power down the auxiliary AC system 130 in response to receiving the control signal. Upon the control signal's removal (upon the start-stop system 120 turning off the engine 102), however, the control circuit is configured to restart the auxiliary AC system 130. As such, the driver needn't manually restart the auxiliary AC system 130 upon the start-stop system 130 powering down the engine 102. As shown, the auxiliary AC system 130 is also connected to the ignition switch 122. For example, upon closure of the ignition switch 122, positive voltage (e.g., IGN signal) may be asserted to the auxiliary AC system 130. In various embodiment, the control circuit is configured to power down the auxiliary AC system 130 in response to receiving the IGN signal (e.g., because, when the engine is on, heating and cooling of the vehicle 100 may be performed via a main AC system). In some embodiments, when the IGN signal is not present (e.g., when the ignition switch 122 is open), the control circuit is configured such that the driver must provide an input via an activation switch to power on the auxiliary AC system 130.

It should be understood that alternative means of controlling the activation of the auxiliary AC system 130 are envisioned. For example, in one embodiment, the start-stop system 120 includes a controller configured to transmit multiple control signals to the auxiliary AC system 130. A first of such control signals may cause the auxiliary AC system 130 to power down (e.g., the first control signal may be asserted in response to start-stop system 120 turning the engine 102 on) and a second may cause the auxiliary AC system 130 to restart (e.g., the second control signal may be asserted in response to the start-stop system 120 turning the engine 102 off). In another embodiment, a controller separate from the auxiliary AC system 130 may receive indications of operations performed via the start-stop system 120 and issue control signals to power the auxiliary AC system 130 on and off responsive to the indications.

As shown, the auxiliary battery bank 112 is connected to the main battery bank 106. In various embodiments, the anode of the main battery bank 106 is connected to the anode of the auxiliary battery bank 112 via a current sensor 108 and/or a battery separator 110. Cathodes of the battery banks may be directly connected to one another, such that current originating from the main battery bank 106 charges the auxiliary battery bank 112. In various embodiments, the combination of the current sensor 108 and battery separator 110 is used to determine when to charge the auxiliary battery bank 112. For example, a solenoid in the battery separator 110 may be switched on to allow current to flow between the auxiliary battery bank 112 and the main battery bank 106 to charge the battery bank. Once the sensed current drops below a threshold, the solenoid may be switched off to discontinue charging. Additionally, a voltage sensor measures a voltage across various terminals of the auxiliary battery bank 112. The measured voltage may be used as a trigger for the start-stop system 120. For example, if a voltage of the auxiliary battery bank 112 drops below a second threshold value, the start-stop system 120 may start the engine 102 to charge the auxiliary battery bank 112 via the main battery bank 106. In addition, the system may include a disconnect component (e.g., a low voltage disconnect) that is configured to disconnect the auxiliary air condition system 130 from the auxiliary battery bank 120 should the voltage of the auxiliary battery bank 120 drop below a predetermined level. In an embodiment, the disconnect component is operable in response to the start-stop system 120 being turned off.

Alternative triggers for starting or stopping the engine 102 are envisioned. For example, in one embodiment, the current sensed by the current sensor may be used to trigger the starting of the engine 102 (e.g., in response to the sensed current being above a threshold value). In some embodiments, a combination of a measured voltage of the auxiliary battery bank 112 and the current measured by the current sensor 108 are used. Furthermore, it should be understood that any of the thresholds described herein used to control the various components of the vehicle 100 may be updated depending on the operational state of the vehicle 100.

Figure 2:
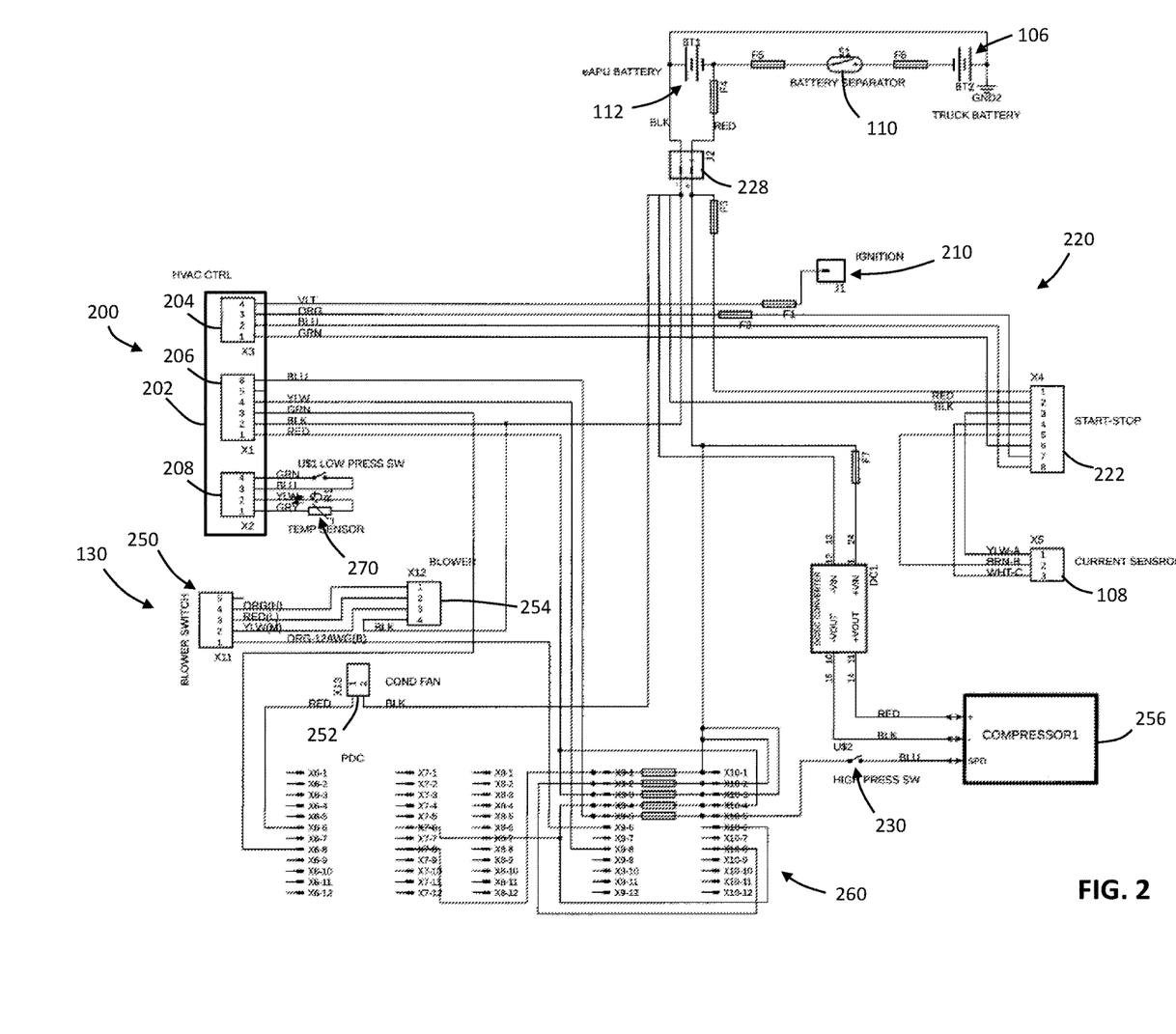
FIG. 2 is a schematic wiring diagram of a control system of the vehicle shown in FIG. 1, according to an example embodiment.

Referring now to FIG. 2, a wiring schematic diagram of a control system 200 of the vehicle 100 described with respect to FIG. 1 is shown, according to an example embodiment. As shown, the control system 200 includes a control circuit 202 controlling operation of the auxiliary AC system 130 and start-stop portion 220 controlling operation of the start-stop system 120. As shown, the auxiliary AC system 130 includes a rotary switch 250, a blower 254 associated with an evaporator, and first and second fans 252 and 256 associated with a condenser and a compressor, respectively. The rotary switch 250 controls an operation speed of the blower 254.

The control circuit 202 includes a first connector 204 through which a number of signals are communicated. As shown, a connector jack 210 receives the IGN signal from the ignition switch 122. The connector jack 210 is connected to a first input of the first connector 204 to provide the control circuit 202 with indications of the state of the ignition switch. Additional inputs to the first connector are coupled to a second connector 222 of the start-stop portion 220. As shown, an ACTIVE signal is provided between inputs of the first and second connectors 204 and 222. In some embodiments, the ACTIVE signal is positively asserted by the start-stop portion 220 when the start-stop system 120 turns the engine 102 on (i.e., the ACTIVE signal corresponds to the control signal described herein). Additionally, the first and second connectors 204 and 220 also exchange kill signals for the auxiliary AC system 130 indicating whether the power unit should be deactivated. A kill signal may be any signal that shuts off or prevents a system from starting. In some embodiments, in response to a voltage of the auxiliary battery bank 112 dropping below a threshold value (e.g., as measured by a voltage sensor) a kill signal is asserted to the connector jack 210, thereby causing the auxiliary AC system 130 to power down.

The control circuit 202 further includes another connector 206 coupled to various components of the auxiliary AC system 130. As shown, a circuit board 260 including a plurality of wire-to-board headers used to facilitate interconnections between the connector 204 and the start-stop portion 220. As shown, power is provided to the control circuit 202 via the auxiliary battery bank 112 by way of associated battery studs 228 and a fuse disposed on the circuit board 260. The voltage from the auxiliary battery bank 112 provided to the connector 206 via HVAC_ON and COND_FAN lines coupled to the second connector 206. The HVAC_ON and COND_FAN signals are coupled to a switch 230. In various embodiments, the switch 230 is a high pressure switch configured to open upon a pressure measured in the auxiliary AC system 130 reaching a threshold value to prevent over-pressurization.

An HVAC_PWR line is coupled to the rotary switch 250 and the second fan 256 to control the operation of the auxiliary AC system 130. In some embodiments, the HVAC_PWR line includes a switch 232 controllable by a user to manually turn the power of the auxiliary AC system 130 back on.

The control circuit 202 also includes a third connector 208. Two inputs of the third connector 208 complete a circuit including a temperature sensor 270 (e.g., a thermistor, thermocouple, or any other temperature sensing device) configured to measure a temperature at a grill of the evaporator of the auxiliary AC system 130. The temperature sensor 270 provides an input voltage to the control circuit 202 proportional to the measured temperature. In various embodiments, the control circuit 202 includes circuitry configured to adjust an operating speed of the compressor fan 256 based on the measured voltage to render the temperature inside of the vehicle adjustable. Two additional inputs of the third connector 208 are coupled to a low pressure switch configured to open and shut down the auxiliary AC system 130 if pressure inside of, for example, an evaporator coil drops below a predetermined value.

Figure 3A:
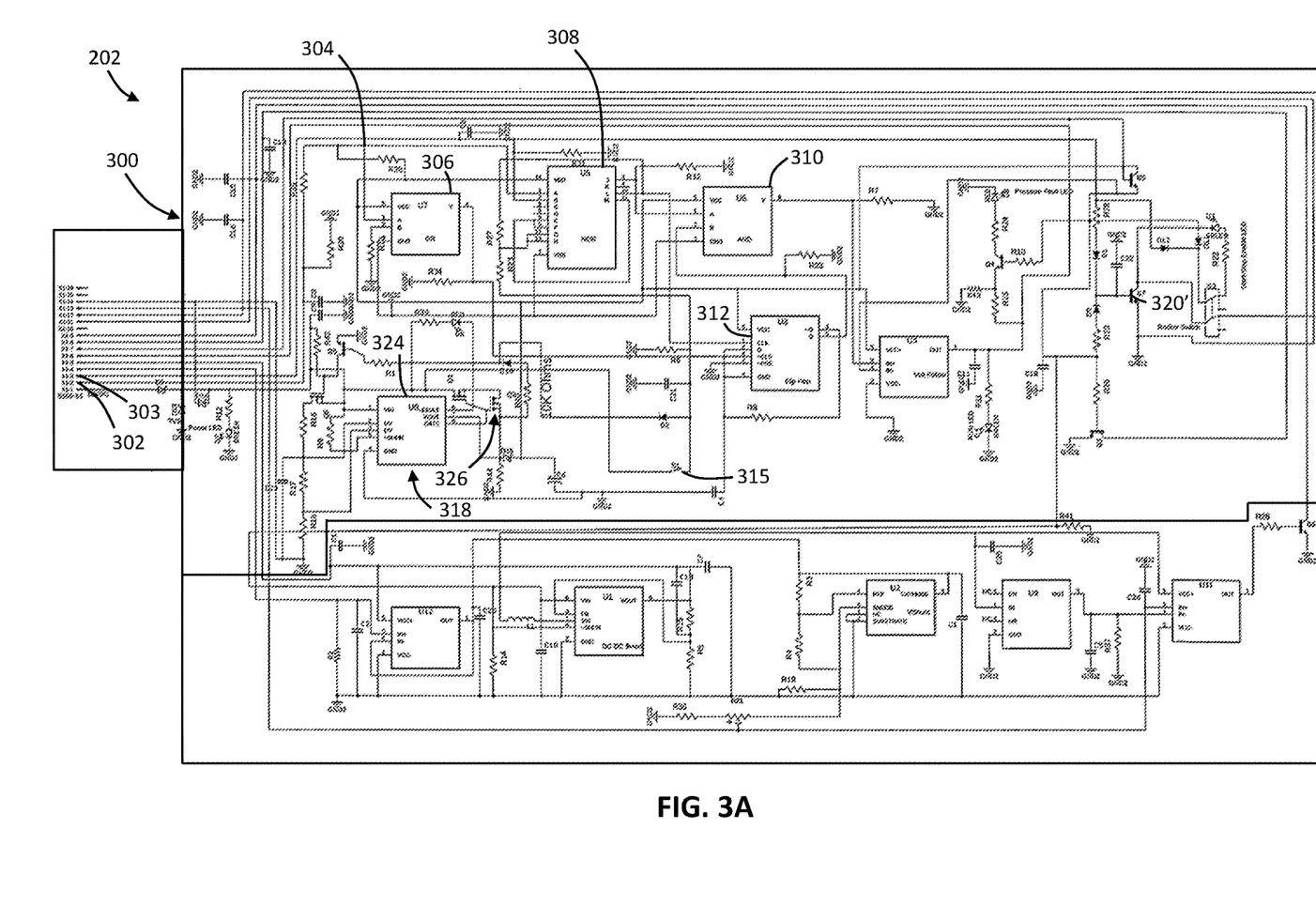
FIG. 3A is a diagram of a control circuit for an auxiliary AC system, according to an example embodiment.

Referring now to FIG. 3A, a schematic diagram of a control circuit 300 for the auxiliary AC system 130 is shown, according to an example embodiment. In various embodiments, the control circuit 300 corresponds to a portion of the control circuit 202 described with respect to FIG. 2. As shown in FIG. 3A, the control circuit 202 is divided into two parts that share a single power supply. In some embodiments, different parts of the control circuit 202 may have their own power supply. As shown, via terminals 302 and 303, the control circuit 300 receives the IGN and control signals described herein. The IGN signal is provided via terminal 302. The control signal is provided via terminal 303. At a first node 304, the IGN signal is split such that a first portion thereof is fed into a first input (A) of an OR gate 306 and a second portion thereof is fed into a first input (A) of a NOR gate 308. The control signal is routed directly into a second input (B) of the NOR gate 308. A second input (B)

of the OR gate 306 has no input. As such, an output (Y) of the OR gate 306 is only affirmatively asserted if the IGN signal has a high value (i.e., if the ignition switch 122 is closed).

The output of the NOR gate 308 only asserts a high output value if neither the IGN and control signals have high values. The output of the NOR gate 308 is relayed to a first input (A) of an AND gate 310. Thus, an affirmative signal is asserted by the AND gate 310 only if neither the IGN and control signals have high values. In various embodiments, the AND gate 310, a memory circuit 312, and a field effect transistor 320 comprise output circuitry configured to output an activation signal to control the powering on of various components (e.g., the evaporator, the compressor, etc.) of the auxiliary AC systems. In some embodiments, the auxiliary AC system 130 is configured to power down when the activation signal takes a low value. As such, upon the assertion of the STRS voltage by the start-stop system 120, the activation signal takes a low value (e.g., due to the NOR gate 308), thus causing deactivation of the auxiliary AC system 130. However, upon removal of the control signal (i.e., upon the start-stop system 120 turning the engine 102 off), the activation signal is re-asserted, causing the auxiliary AC system 130 to restart.

In some embodiments, the memory circuit 312 is a D-type positive edge flip-flop. The second input (B) of the AND gate 310 is coupled to a positive output (Q) of the memory circuit 312. The memory circuit 312 includes a clock (CLK) input, a data (D) input, a preset (PRE) input, and a clear (CLR) input. As shown, the PRE input is connected to ground. Thus, when the CLR is not asserted, the memory circuit 312 may transport the signal at the D input to the positive output Q at a rising edge of the CLK input.

The CLR input is coupled to the output of the OR gate 306. Thus, whenever the IGN signal has a high value, the CLR input asserted and the output of the memory circuit 312 is set to zero, thus causing the output of the AND gate 310 to become zero, removing the activation signal, thereby causing the auxiliary AC system 130 to shut down. Removal of the IGN signal (i.e., the opening of the ignition switch 122), however, may not have an effect on the output of the memory circuit 312, thereby having no effect on the operational state of the auxiliary AC system 130.

Figure 3B:
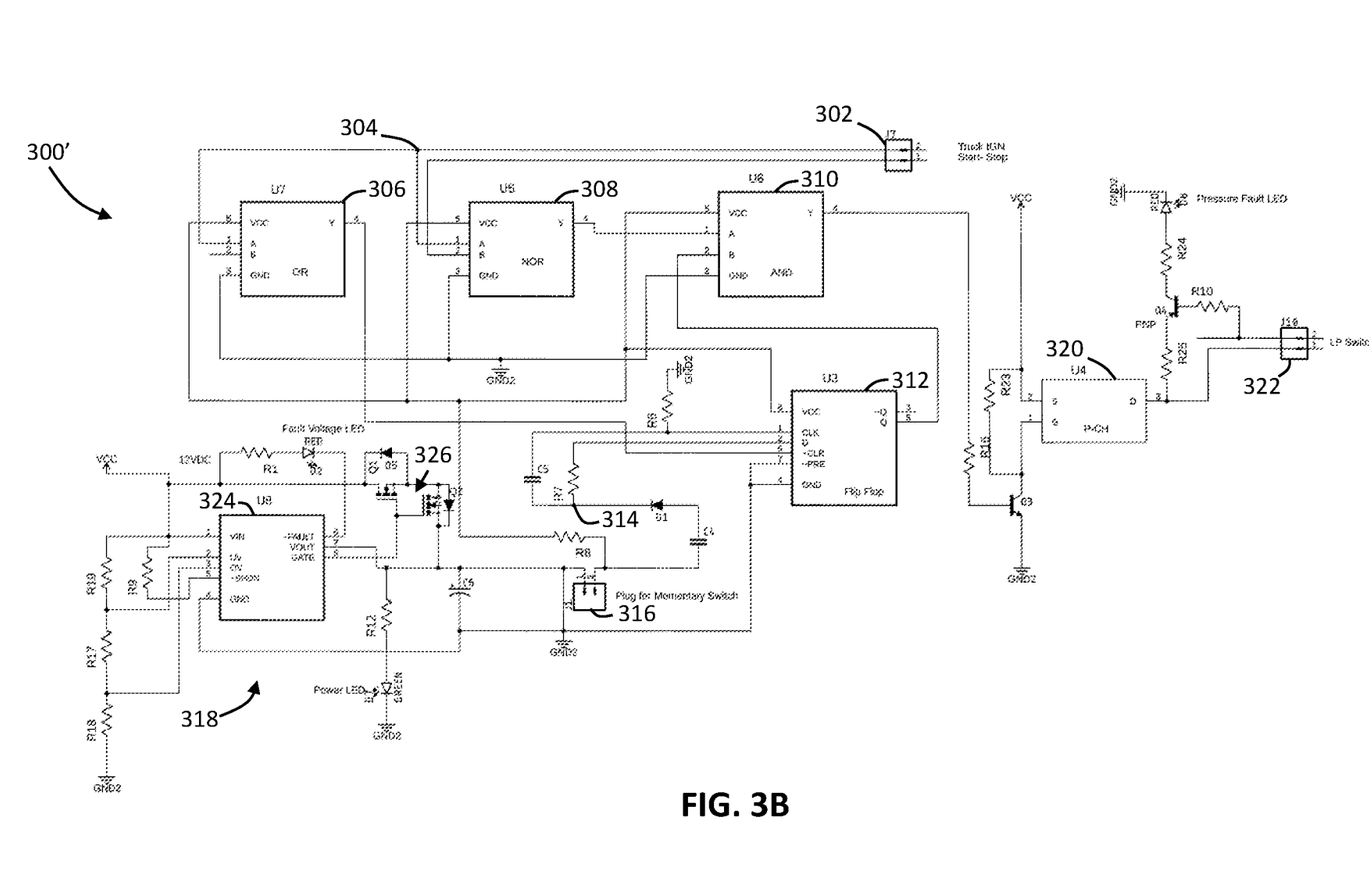
FIG. 3B is a diagram of a control circuit for an auxiliary AC system, according to another example embodiment.

As shown, the D input of the memory circuit 312 is coupled to a switch 315. In some embodiments, the CLK input of the memory circuit 312 is also coupled to the switch 315. Referring now to FIG. 3B, a schematic diagram of a control circuit 300' is shown, according to another example embodiment. For clarity, like numbering has been used in FIGS. 3A and 3B for the same or similar components. In the embodiment of FIG. 3B, both the D and CLK inputs of the memory circuit 312 are coupled to a node 314 attached to a plug 316. The plug 316 is coupled to a switch (not shown but analogous to switch 315 in FIG. 3A). In the embodiment of FIG. 3B, the switch is configured to selectively couple the CLK and D inputs of memory circuit 312 to an input voltage provided by a voltage control circuit 318 as described herein. In some embodiments, the switch is a momentary switch configured to couple and decouple the CLK and D inputs in response to a user pressing a button. As shown in FIG. 3B, a capacitor C4 and a diode D1 are disposed between the plug 316 and the node 314. When the switch is closed (i.e., to connect the voltage control circuit 318 to the node 314), current from the voltage control circuit 318 charges the capacitor C4 to provide current via the diode D1 to the node 314.

At the node 314, the current is separated between a first wire coupling the CLK input to the node 314 and a second wire coupling the D input to the node 314. As shown in FIG. 3B, a resistor R7 is disposed at the second wire between the node 314 and the D input such that, upon closing of the switch, a voltage appears at the D input. A capacitor C5 is disposed at the first wire between the node 314 and the CLK input. The first wire also includes an additional node having a resistor R6 disposed between the resistor and ground. As such, upon closure of the switch coupled to the plug 316, the voltage at the CLK will rise at a rate depending on the capacitance of the capacitor C5 and the resistance of the resistor R6.

Thus, when the IGN signal is off and the switch is closed, once the voltage at the CLK input rises to a threshold value (e.g., determined by the configuration of the memory circuit 312), the high voltage value at the D input is transported to the positive output Q of the memory circuit 312, and thereby provided to the second input B of the AND gate 310. As such, flipping the switch has no effect unless neither the IGN signal nor the control signal is asserted.

As shown in FIG. 3B, the output of the AND gate 310 is communicably coupled to a base of a bi-polar junction transistor Q3. The collector of the transistor Q3 is coupled to a positive voltage source via a resistor R23. The collector of the transistor Q3 is also coupled to a gate of a field effect transistor 320 (e.g., a MOSFET). Thus, the current emanating from the collector of the transistor Q3 controls the current between the source and the drain of the field effect transistor 320. The drain of the field effect transistor Q3 is coupled to a plug 322 coupled to the auxiliary AC system. Through the plug 322, the activation signal described herein is provided to the auxiliary AC system 130. As shown, the field effect transistor 320 may also be coupled to a transistor Q4. A base of the transistor Q4 may be coupled to a pressure sensor (not shown) of the auxiliary AC system such that a pressure fault LED indicator lights up upon the activation signal being provided and a sensed pressure in the auxiliary AC system not being within a predetermined range of values to indicate a fault.

Thus, in a situation in which both the IGN and control signals are off, the user can restart the auxiliary AC system by pressing a button on the switch connected to the plug 316. When the control signal takes on an affirmative value (e.g., when the start-stop system turns the engine on or off), the output of the AND gate 310 is negated, thus causing the activation signal output via the field-effect transistor 320 to be negated and the auxiliary AC system 130 to turn off. However, once the control signal is negated by the start-stop system, the output of the AND gate 310 becomes affirmative once again, thereby causing the auxiliary AC system 130 to restart. In the embodiment shown in FIG. 3A, the function of the field-effect transistor 320 is performed by transistor Q7 (320').

As shown in FIGS. 3A and 3B, the voltage control circuit 318 includes a voltage supervisor 324 connected to a power supply. The voltage supervisor 324 includes an overvoltage (OV) input and an under-voltage (UV) input. The OV and UV inputs are comparator inputs used to determine if an input voltage from the power supply is between predetermined values established by resistors (e.g., resistors R17, R18, and R19 in FIG. 3B) disposed between the power supply, the OV and UV inputs, and ground. A Shutdown pin (SHDN) provides external control for enabling and disabling the voltage supervisor 324. A FAULT output is connected to an LED to indicate when the input voltage is outside the predetermined range. A gate output controls conductive states of a pair of MOSFETs 326 to only output a supply current to the remainder of the components of the control circuit 202 if the input voltage is within the predetermined range. This way, various components of the control circuit 300 (e.g., the OR gate 306, the NOR gate 308, the and Gate 310, etc.) are protected from voltage oversupply.

Figure 4:
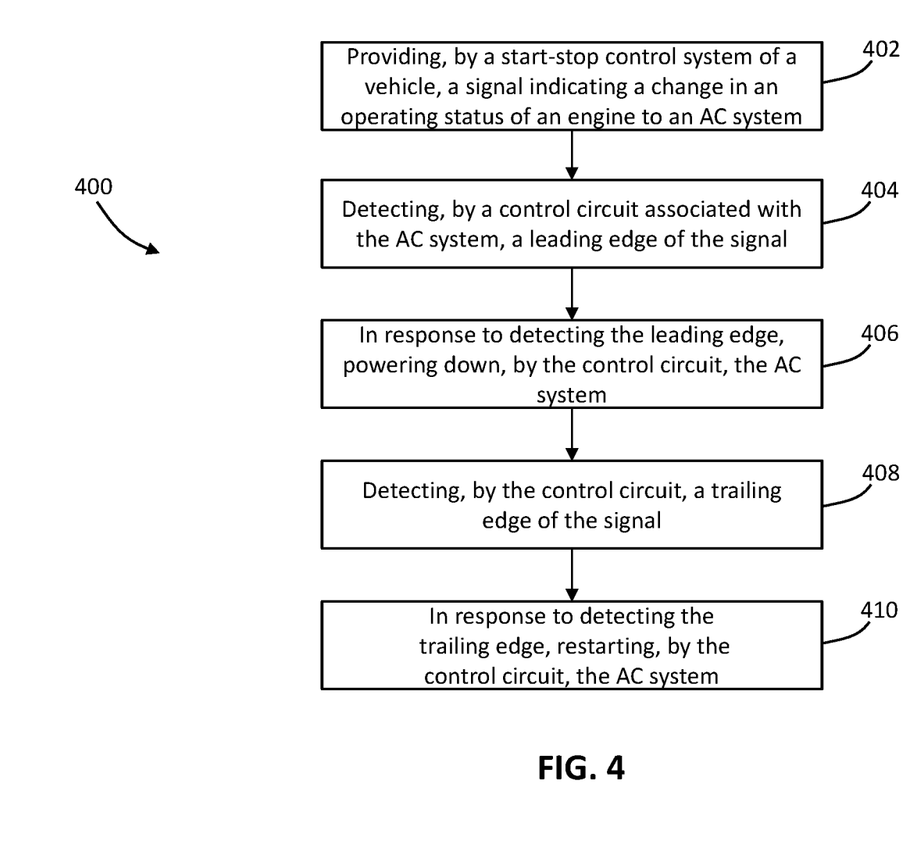
FIG. 4 is a flow diagram of a method controlling an auxiliary AC system based on a signal from a start-stop system, according to an example embodiment.

Referring now to FIG. 4 is a flow diagram of a method 400 of controlling an auxiliary AC system based on a signal from a start-stop system is shown, according to an example embodiment. The method 400 may be performed via various components described herein with respect to FIGS. 1-3B. Accordingly, reference may be made to such components to aid in the description of the method 400.

In an operation 402, the start stop system 120 of the vehicle 100 provides a signal indicating a change in an operating status of the engine 102 to the auxiliary AC system 130. As described herein, in response to turning the engine 102 on, the start-stop system 120 may assert a control signal that is input to a control circuit (e.g., the control circuit 202) of the auxiliary AC system 130. In an operation 404, the control circuit 202 detects a leading edge of the signal. For example, upon a voltage of the control signal becoming positive, an output (e.g., of the NOR gate 308) may become a low value. In an operation 406, in response to detecting the leading edge of the signal, the control circuit 202 powers down the auxiliary AC system 130. For example, in response to the output of the NOR gate 308 becoming a low value, the output of the AND gate 310 also becomes a low value, thereby causing the activation signal provided via the control signal to become a low value, which causes the auxiliary AC system to power down.

In an operation 408, the control circuit 202 detects a trailing edge of the signal. For example, upon the start-stop system 120 shutting the engine 102 off, the start-stop system 120 may no longer assert the control signal, causing a falling edge of the control signal. In response, the NOR gate 308 output may become positive once again. In an operation 410, the control circuit 202 restarts the auxiliary AC system 130 in response to detecting the trailing edge. For example, upon the NOR gate 308 output becoming positive, the output of the AND gate 310 may become positive (assuming the IGN switch is not closed), causing the activation signal to be asserted to restart the auxiliary AC system 130. Thus, the auxiliary AC system is automatically restarted upon the turning off of the engine via the start-stop system 120.

Figure 5:
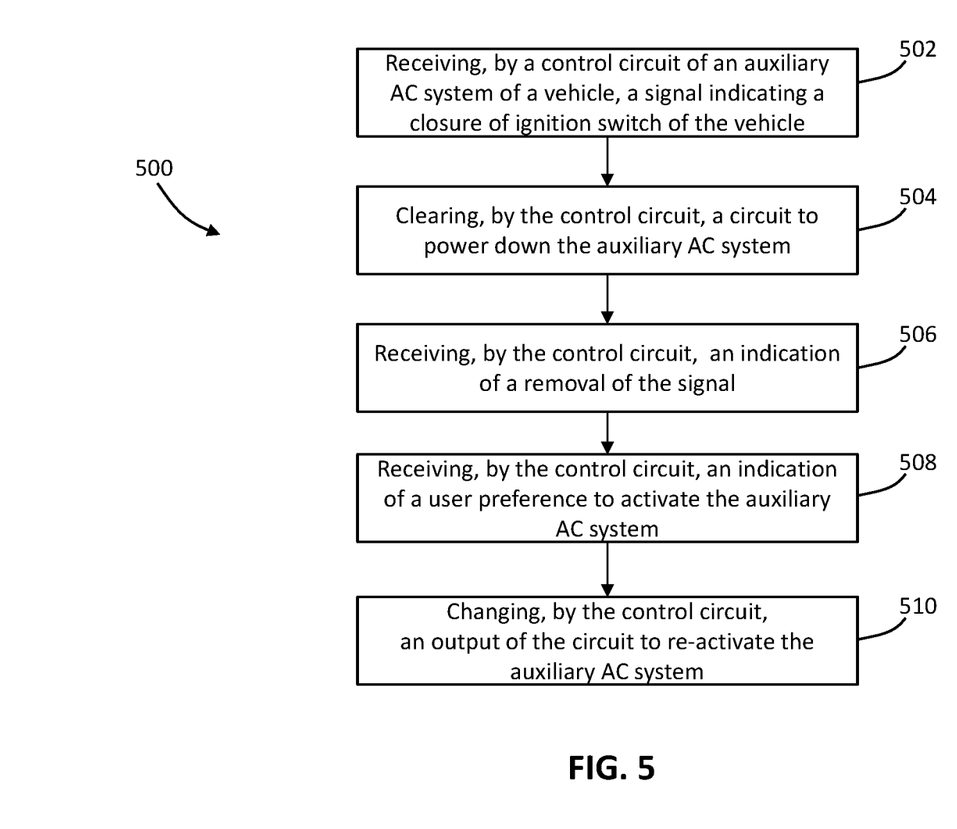
FIG. 5 is a flow diagram of a method of controlling an auxiliary AC system based on a state of an ignition switch, according to an example embodiment.

Referring now to FIG. 5, a flow diagram of a method 500 of controlling an auxiliary AC system based on a state of an ignition switch is shown, according to an example embodiment. The method 500 may be performed via various components described herein with respect to FIGS. 1-3B. Accordingly, reference may be made to such components to aid in the description of the method 500.

In an operation 502, the control circuit 202 receives a signal indicating a closure of the ignition switch 122. For example, a driver of the vehicle 100 may rotate a key thereby closing the ignition switch 122, causing a positive current (e.g., the IGN signal) to be input to the control circuit 202. In an operation 504, the control circuit 202 clears the output of the memory circuit 312 in response to receiving the signal. For example, the receipt of the IGN signal may cause the output of an OR gate 306 to become a high value. The output of the OR gate 306 may be coupled to a CLR input of the memory circuit 312, thereby causing the output of the memory circuit 312 to dip to a low value. This dip may cause the activation signal output via output circuitry of the control circuit 202 to drop to a low value, causing the auxiliary AC system 130 to power down.

In an operation 506, the control circuit 202 receives an indication of a removal of the signal. For example, the driver may open the ignition switch 122, causing the output of the OR gate 306 to become a low value. However, since the output of the OR gate 306 is coupled to the CLR input of the memory circuit 312, such an operation may not cause the output of the memory circuit 312 to change. As a result, the auxiliary AC system 130 may remain off until the driver manually resets the memory circuit 312 via an input switch (e.g., a momentary switch coupled to an activation button). In an operation 508, the control circuit 202 receives an indication of a user preference to activate the auxiliary AC system 130. For example, a user may manually close the input switch, causing a positive voltage at a D input of the memory circuit 312 to be transported to the output, thereby causing the output of the AND gate 310 to become positive. In an operation 510, the control circuit 202 re-activates the auxiliary AC system 130. For example, the output of the AND gate 310 may be coupled to a base of a transistor, causing current to flow from a terminal thereof to provide an activation signal to the auxiliary AC system 130.

Figure 6:
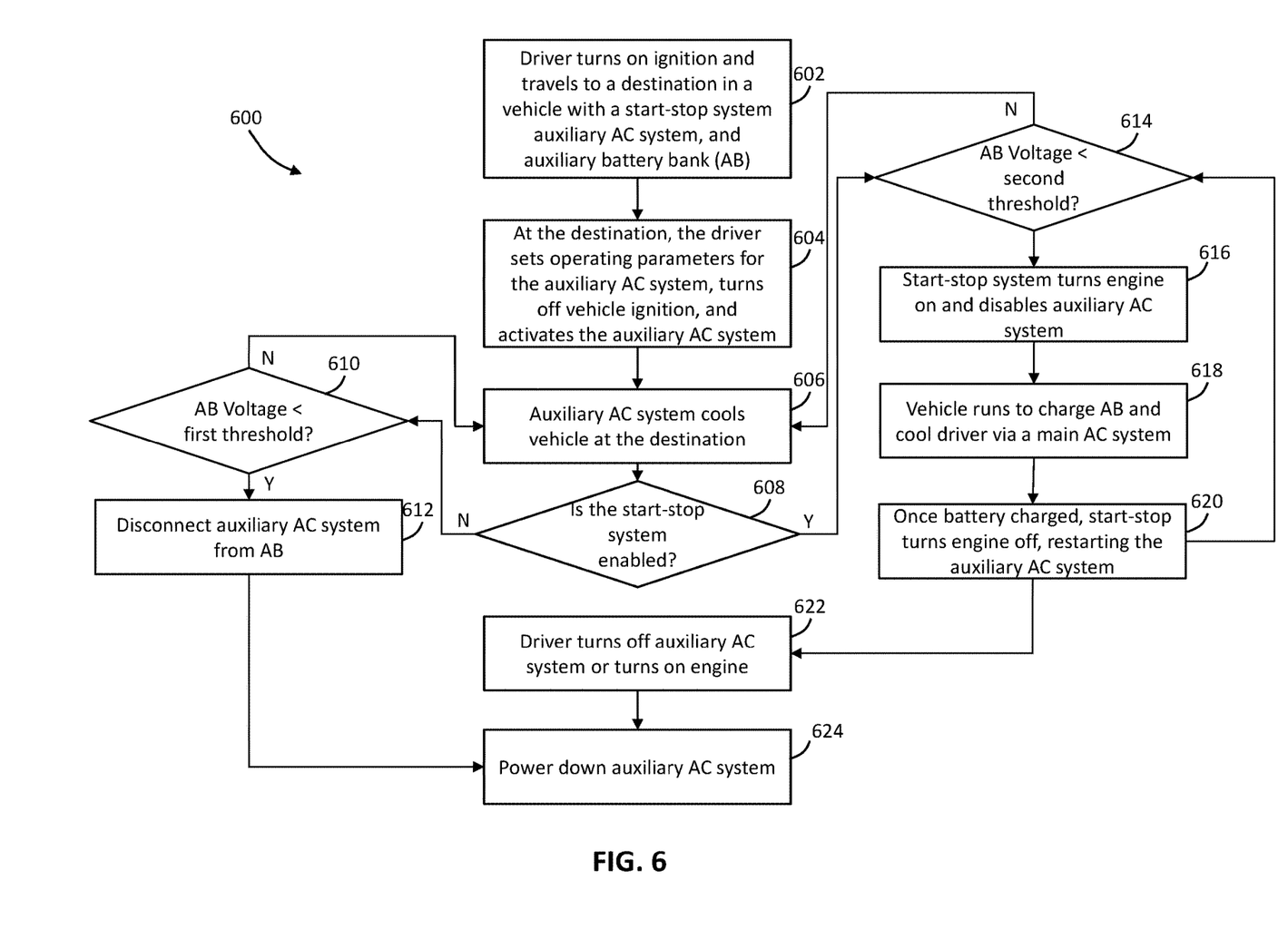
FIG. 6 is a flow diagram of a method of operating a start-stop system and auxiliary AC system of a vehicle, according to an example embodiment.

Referring now to FIG. 6, a flow diagram of a method 600 of operating a start-stop system and auxiliary AC system of a vehicle in response to various actions by a driver is shown, according to an example embodiment. The method 600 may be performed via various components described herein with respect to FIGS. 1-3A. Accordingly, reference may be made to such components to aid in the description of the method 600.

In an operation 602, a driver turns on the ignition of the vehicle 100 (e.g., by flipping on the ignition switch 122) and travels to a destination. During the travel, the vehicle 100 may utilize various vehicle subsystems (e.g., a main AC system powered via the main battery bank 106) to operate in a desired manner. In an operation 604, once at the destination, the driver may set operating parameters for the auxiliary AC system (e.g., a setpoint temperature), turn off the ignition, and activate the auxiliary AC system. For example, the driver may press a button of a momentary switch of the control circuit 202 to cause the memory circuit 312 to assert an affirmative output to cause the control circuit 202 to assert an affirmative activation signal to power on the auxiliary AC system 130. With the ignition off, the auxiliary AC system 130 may operate using the auxiliary battery bank 112 as a power source to cool the interior of the vehicle in an operation 606.

In an operation 608, the control system of the vehicle 100 determines whether the start-stop system is enabled (e.g., based on the status of an activation switch for the start-stop system on a dashboard of the vehicle). If not, in an operation 610, via a voltage sensor, the control system monitors the voltage of the auxiliary battery bank 112 and continues to cool the interior of the vehicle 100 until the measured voltage is below or equal to a first threshold (e.g., 10.5 volts), at which point the auxiliary battery bank 112 is disconnected (e.g., via the battery separator 110) in an operation is 612 and the auxiliary AC system is powered down in an operation 624.

In an operation 614, if the start-stop system 120 is enabled, the control system monitors the voltage of the auxiliary battery bank 112 and continues to cool the interior of the vehicle 100 until the measured voltage is below or equal to a second threshold (e.g., 11.5 volts), at which point the start-stop system turns on the engine 102 to disable the auxiliary AC system 130 (e.g., due to the assertion of the control signal) in an operation 616. As such, the engine 102 runs the main AC system to cool the driver and to charge the auxiliary battery bank 112 in an operation 618. In various embodiments, if the engine 102 fails to charge the auxiliary battery bank 112 within a predetermined period, this serves as a trigger for the start-stop system 102 to turn the engine 102 off to restart the auxiliary AC system 130. For example, in one embodiment, if the engine 102 fails to charge the engine 102 within a three-hour (or approximately three-hour) period, the start-stop system 120 may turn the engine 102 off to restart the auxiliary AC system 130 and limit the run-time of the engine 102. In some embodiments, the engine 102 is turned off after a pre-determined period irrespective of the state of charge of the auxiliary battery bank 112.

In an operation 620, once the auxiliary battery bank 112 is charged (e.g., once a measured current by the current sensor 108 drops below a predetermined value), the start-stop system 120 shuts the engine 102 off, which causes the control signal to be removed and the auxiliary AC system 130 to restart and cool the driver. The operations 614-620 may repeat any number of times if the auxiliary battery voltage drops below the second threshold again. In an operation 622, the driver turns off the auxiliary AC system 130 (e.g., via the momentary switch) or turns on the engine (e.g., by closing the ignition switch 122). For example, after sleeping, the driver may awake and start the engine to drive to another destination. As described herein, either of these operations causes the auxiliary AC system 130 to power down.

One or more flow diagrams may have been used herein. The use of flow diagrams is not meant to be limiting with respect to the order of operations performed. The herein described subject matter sometimes illustrates different components contained within, or connected with, different other components. It is to be understood that such depicted architectures are merely illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A vehicle comprising:
   an engine;
   a start-stop system configured to stop and restart operation of the engine in response to predetermined triggers; and
   an auxiliary air conditioning (AC) system including a controller communicably coupled to the start-stop system, wherein the start-stop system is configured to provide a first indication to the auxiliary AC system indicating ignition of the engine and a second indication to the auxiliary AC system after stopping the engine, wherein the auxiliary AC system is configured to:
   turn off the auxiliary AC system in response to receiving the first indication; and
   automatically restart the auxiliary AC system without manual activation of the auxiliary AC system by a driver in response to receiving the second indication indicating the engine has been shut off.

2. The vehicle of claim 1, further comprising an ignition switch configured to complete a starter circuit to start and stop the engine, wherein the starter circuit is communicably coupled to the controller such that the controller receives an ignition signal from the starter circuit upon closure of the ignition switch, wherein the controller is configured to turn off the auxiliary AC system in response to receiving the ignition signal.

3. The vehicle of claim 2, wherein the controller includes a user-input switch configured to receive user preferences to activate and deactivate the auxiliary AC system, wherein, in response to the auxiliary AC system being off and the ignition signal being low, the controller is configured to turn the auxiliary AC system on in response to receiving a user input to activate the auxiliary AC system.

4. The vehicle of claim 3, wherein the user-input switch comprises a momentary switch.

5. The vehicle of claim 1, further comprising a main battery and an auxiliary battery, wherein the main battery is connected to an alternator to receive electricity generated via the alternator, wherein the main battery is electrically connected to the auxiliary battery such that the auxiliary battery receives charge from the main battery, wherein the auxiliary battery is electrically connected to the auxiliary AC system to provide electrical power thereto.

6. The vehicle of claim 5 further comprising a disconnect component disposed at a connection between the auxiliary battery and the main battery, wherein the disconnect component is configured to disconnect the auxiliary AC system from the auxiliary battery in response to determining that a voltage of the auxiliary battery satisfies a first threshold value.

7. The vehicle of claim 6, wherein the start-stop system is configured to start the engine in response to determining that a voltage of the auxiliary battery is below a second threshold value.

8. The vehicle of claim 1, wherein the controller further comprises:
a control circuit, comprising:
a first input line coupled to an ignition switch of the vehicle;
a second input line coupled to the start-stop system, wherein the start-stop system is configured to assert a control signal to the control circuit via the second input line in response to turning the engine of the vehicle on and remove the control signal in response to turning the engine of the vehicle off;
control circuitry coupled to the first and second input lines; and
output circuitry coupled to the control circuitry, wherein the output circuitry is configured to assert an activation signal to the auxiliary AC system in response to a command from the control circuitry such that, when the control signal is removed, the activation signal is asserted to restart the auxiliary AC system after the vehicle is turned off via the start-stop system.

9. The vehicle of claim 8, wherein the control circuitry comprises a NOR gate coupled to the first and second input lines, wherein the output circuitry is coupled to the NOR gate, and wherein the output circuitry is configured to assert the activation signal to the auxiliary AC system when an output of the NOR gate is positive.

10. The vehicle of claim 9, wherein the output circuitry includes an AND gate and a memory circuit, wherein the AND gate comprises:
a first input coupled to the output of the NOR gate; and
a second input coupled to an output of the memory circuit such that the output circuitry is configured to assert the activation signal when both the NOR gate and the memory circuit have high values.

11. The vehicle of claim 10, wherein the memory circuit includes a positive-edge triggered D-type flip-flop including a data input coupled to a user-input switch.

12. The vehicle of claim 11, wherein the memory circuit includes a clock input coupled via a capacitor to the user-input switch such that, when the user closes the user-input switch, the output of the memory circuit switches to an affirmative value to cause the output circuitry to assert the activation signal.

13. The vehicle of claim 11, wherein the memory circuit includes clear input coupled to the first input line such that, when the ignition switch is closed, the output of the memory circuit is cleared to cause a removal of the activation signal.

14. The vehicle of claim 11, wherein the user-input switch is a momentary switch coupled to the memory circuit.

15. The vehicle of claim 14, further comprising a voltage control circuit includes a voltage regulator configured to maintain the supply voltage within a predetermined range, the predetermined range being configured by a plurality of resistors coupling an upper bound input of the voltage regulator to a ground.

16. The vehicle of claim 8, further comprising a temperature control circuit coupled to a temperature sensor measuring a temperature of return air of an evaporator of the auxiliary AC system, the temperature control circuit configured to adjust a speed of a compressor fan of the auxiliary AC system based on changes in the measured temperature.

* * * * *